United States Patent [19]
Kugler

[11] 3,946,609
[45] Mar. 30, 1976

[54] BAROMETRICALLY COMPENSATED PRESSURE INDEX CONTINUOUS INTEGRATOR FOR MEASURING THROUGHPUT FLUID FLOW OF METERS

[75] Inventor: Carl J. Kugler, Philadelphia, Pa.
[73] Assignee: The Singer Company, New York, N.Y.
[22] Filed: May 22, 1974
[21] Appl. No.: 472,246

[52] U.S. Cl. ............................. 73/233; 73/194 R
[51] Int. Cl.² .......................................... G01F 1/12
[58] Field of Search .......... 73/233, 194 R, 232, 262, 73/393, 32 R; 277/88

[56] References Cited
UNITED STATES PATENTS

| | | | |
|---|---|---|---|
| 2,662,757 | 12/1953 | Mock | 73/233 |
| 3,053,082 | 9/1962 | Loud et al. | 73/233 X |
| 3,073,157 | 1/1963 | Gehre | 73/233 |
| 3,318,150 | 5/1967 | Rose | 73/233 |
| 3,336,034 | 8/1967 | Smith | 277/88 |
| 3,780,580 | 12/1973 | Kugler | 73/233 |

Primary Examiner—Richard C. Queisser
Assistant Examiner—Stephen A. Kreitman
Attorney, Agent, or Firm—Chester A. Williams, Jr.; Marshall J. Breen; Harold Weinstein

[57] ABSTRACT

A barometrically compensated pressure index continuous integrator assembly for measuring the throughput fluid flow of a meter comprising a pressure sensing means mounted within a chamber and adapted to expand or contract in a straight line responsive to changes in the pressure of the fluid flow. The chamber or pressure sensing means communicates with the fluid flow of the meter to communicate line pressure therefrom and the other is evacuated to substantially zero absolute pressure. A link transfer assembly interconnects the pressure sensing means with a pressure index continuous integrator for regulating the output thereof in accordance with variations in the absolute pressure being measured.

4 Claims, 5 Drawing Figures

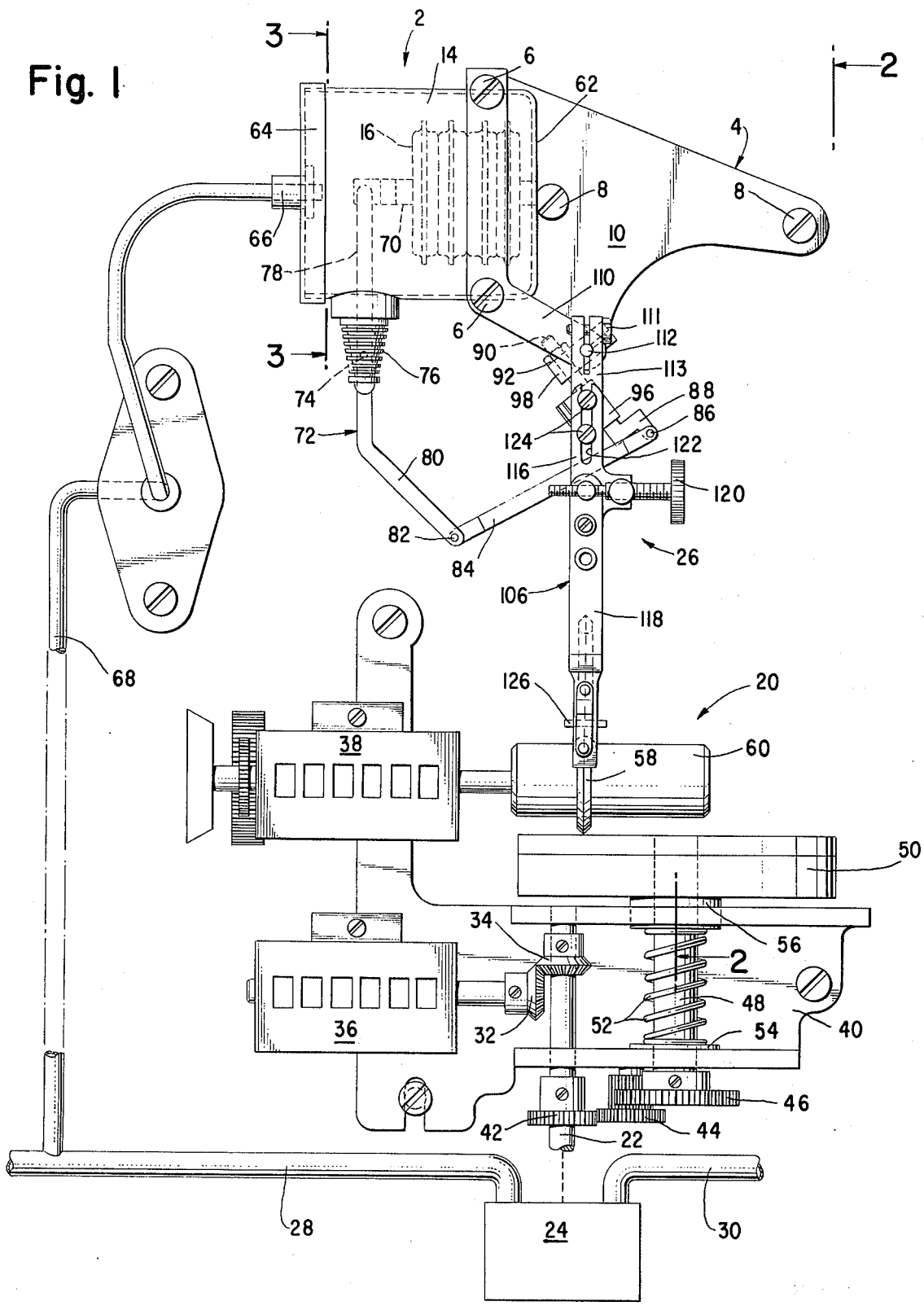

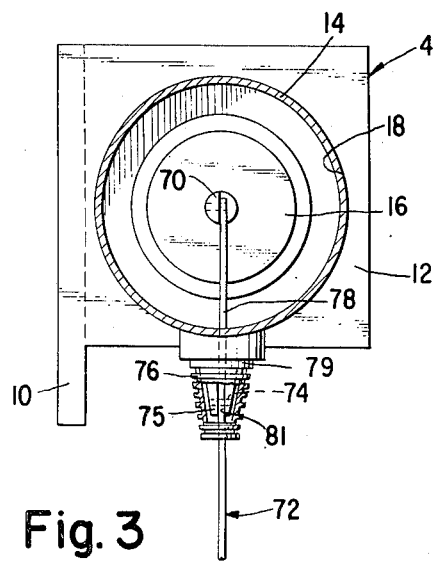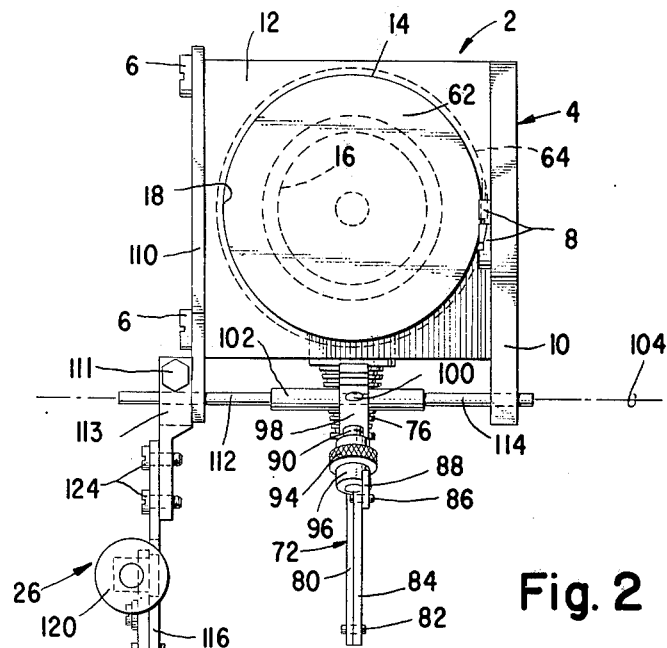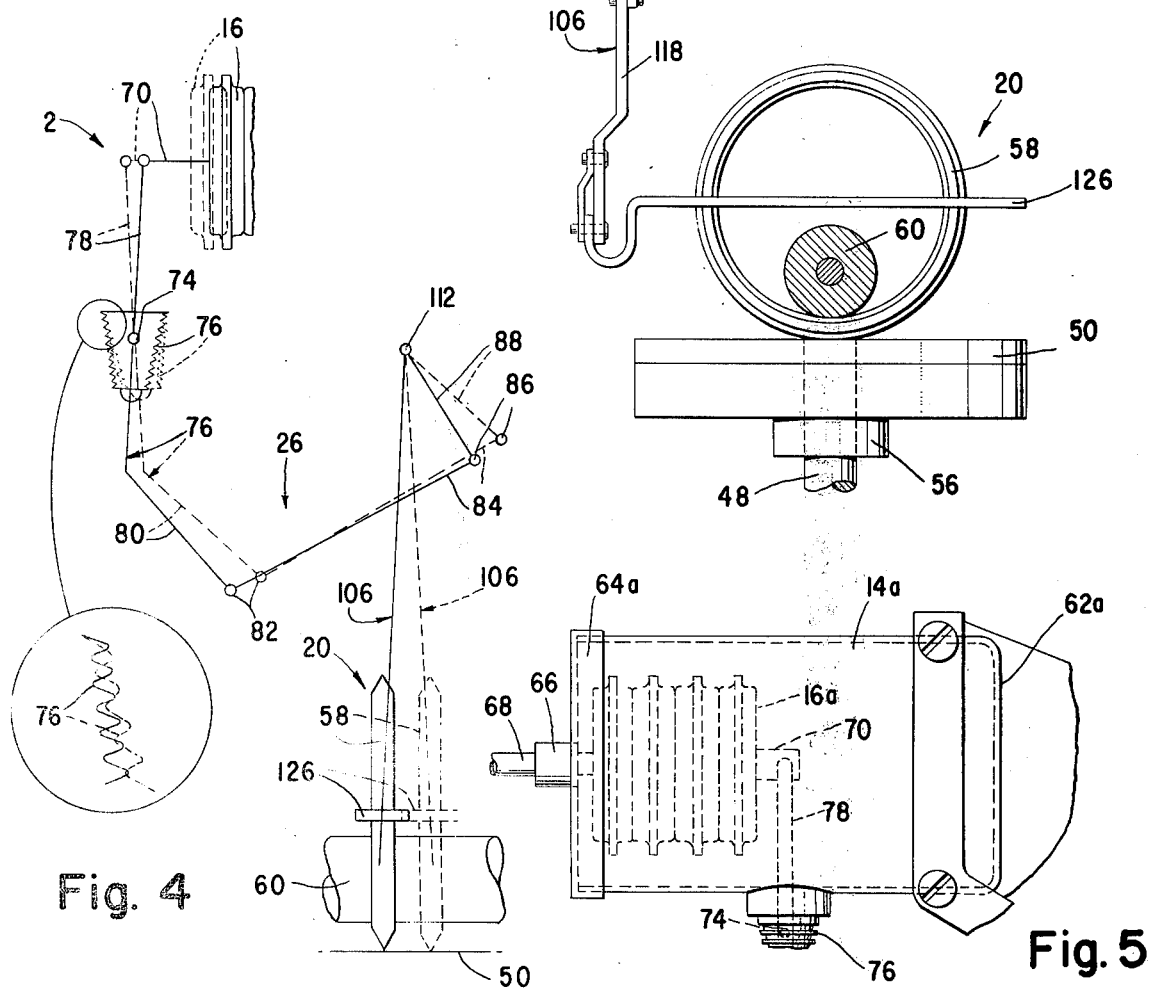
Fig. 3
Fig. 2
Fig. 4
Fig. 5

BAROMETRICALLY COMPENSATED PRESSURE INDEX CONTINUOUS INTEGRATOR FOR MEASURING THROUGHPUT FLUID FLOW OF METERS

BACKGROUND OF THE INVENTION

It has been known heretofore to employ pressure compensating devices in conjunction with continuous integrators in order to obtain corrected volumetric gas measurements for meters. Such integrators frequently also provide for temperature compensation. For a complete disclosure of such a continuous integrator reference may be had to U.S. Pat. No. 3,538,766 granted Nov. 10, 1970. U.S. Pat. No. 3,780,580 granted Dec. 25, 1973 may also be referred to for a description of a prior art continuous integrator in which a pressure sensing element is interconnected with the integrator and in which both the pressure sensing element and the integrator have linear output motion as compared with earlier integrator assemblies in which one or more radial outputs resulted in the production of geometric error in converting the radial output to linear.

The pressure corrections applied to the integrator, as is well known, are based upon Boyle's law which may be expressed by the formula $$O = q \; \frac{A + p}{Pb}$$

where $Q$ is the volume of gas at a standard or base pressure, $q$ represents the uncorrected volume of gas measured by the meter, $A$ is the atmospheric pressure at the point of measurement in pounds absolute, $p$ is the gage pressure and $Pb$ is the standard or base pressure in pounds absolute. Thus, the volume of measured gas corrected to standard or base pressure will be seen to be a function of the ratio of absolute pressure at the point of measurement and at the desired standard or base pressure.

It has been appreciated prior to the present invention that compensation for fluctuations in atmospheric pressure at the location where volumetric measurement is being carried out is desirable. It becomes increasingly important to provide such compensation with measuring devices which operate in the low pressure range, i.e. 0–5 p.s.i.g. Changes in atmospheric pressure are attributable to (a) differences in elevation from one measuring site to another and (b) meteorological conditions at the site. The latter factor may vary constantly at a given site. Earlier attempts to provide such barometric compensation have required complex mechanism and frequently needed careful manual monitoring. There has, therefore, been a need for an integrator of the character described having the capability of automatic compensation for pressure variations including such as are attributable to atmospheric pressure changes.

SUMMARY OF THE INVENTION

In view of the foregoing it is one object of this invention to provide a barometrically compensated pressure index continuous integrator assembly for measuring the throughput fluid flow of a meter.

Another object of the invention is the provision of an integrator assembly of the character described which automatically compensates for barometric variations stemming from physical location and meteorological conditions.

Yet another object of this invention is the provision of a barometrically compensated low pressure index continuous integrator assembly which is simple, economical, reliable and accurate.

Still another object of this invention is the provision of a barometrically compensated pressure index continuous integrator assembly for measuring the throughput fluid flow of a gas meter which functions more closely in accordance with the principle of Boyle's law than prior art devices.

Other objects and advantages of the invention will become readily apparent to persons skilled in the art from the following description thereof.

According to the present invention there is provided a barometrically compensated pressure index continuous integrator assembly for measuring the throughput fluid flow of a meter which comprises:

a. a housing;
b. a chamber mounted on said housing;
c. a pressure sensing means mounted within said chamber adapted to expand or contract in a straight line responsive to changes in the pressure of the fluid flow;
d. one of said chamber and pressure sensing means being in communication with the fluid flow of the meter to communicate line pressure therefrom;
e. the other of said chamber and pressure sensing means being evacuated to substantially zero absolute pressure;
f. a pressure index continuous integrator mounted on said meter;
g. and a link transfer assembly interconnecting said pressure sensing means with said integrator for regulating the output thereof in accordance with variations in the absolute pressure being measured.

BRIEF DESCRIPTION OF THE DRAWINGS

In order that the invention may be more fully comprehended it will now be described, by way of example, with reference to the accompanying drawings in which:

FIG. 1 is a side elevational view of a pressure index continuous integrator assembly and meter embodying the present invention;

FIG. 2 is an end elevational view, partly in section, of the barometric compensation mechanism and a portion of the integrator taken along line 2—2 of FIG. 1;

FIG. 3 is an end elevational view, partly in section, of the barometric compensation mechanism taken along line 3-3 of FIG. 1;

FIG. 4 is a schematic diagram showing the transfer of motion from the pressure sensing element of the barometric compensation mechanism to the ring of a ring integrator; and FIG. 5 is a side elevational view of a modification of the barometric compensation mechanism.

DETAILED DESCRIPTION OF THE INVENTION

Referring to the drawings there is shown a barometric compensation mechanism 2 mounted on a bracket 4 by fastening means such as screws 6. The bracket itself may be mounted on the inner wall (not shown) of a meter housing by fastening means such as screws 8. The bracket is conveniently an L shaped member comprised by an inner leg 10 and an outer leg 12.

The barometric compensation mechanism 2 includes a chamber 14 which is desirably cylindrical and closed at both ends except as described below. Within the chamber there is positioned a pressure sensing element 16. Such element is preferably of the bellows type and, from a manufacturing standpoint, it has been found economical to employ a plurality of flexible diaphragms to form a diaphragm stack as has been known heretofore. The chamber 14 is mounted within a central opening 18 formed in outwardly extending leg 12 of bracket 4. Such opening is preferably dimensioned to provide a snug fit for reception of the chamber.

Mounted also within the meter housing, below the barometric compensation mechanism 2, is a pressure index continuous integrator 20 driven by the output shaft 22 of meter 24. A link transfer assembly, indicated generally by reference numeral 26, interconnects the pressure sensing means 16 and the continuous integrator. As will be seen from the ensuing description of the invention, such interconnection enables regulation of the output of the integrator in accordance with variations in the absolute pressure being measured.

As shown in FIG. 1 meter 24 is employed to measure the throughput flow of a fluid which enters by means of inlet conduit 28 and exits the meter via outlet conduit 30. The fluids measured are compressible fluids such as a gas or vapor. As is conventional, the output shaft 22 of the meter transmits the meter output by means of a pair of bevel gears 32, 34 to an uncorrected counter 36 which is used to provide a visual check of the operation of meter 24. The output shaft 22, counter 36, as well as a corrected counter 38 and selected elements of the continuous integrator are carried by a lower frame 40.

Thus, shaft 22 is journaled in frame 40 and, in addition to bevel gear 34, has pinion 42 secured thereto for driving engagement through gears 44 and 46 with shaft 48. Shaft 48 is rotatably carried by the frame 40 and carries at its upper end friction disc 50. Coil spring 52 which encircles shaft 48 is constrained between a pair of collars 54, 56 on the shaft and urges the friction disc upwardly into engagement with ring 58 to clamp such ring between the disc and a roller 60 to be hereinafter described. However, ring integrators have been known heretofore and, as previously stated, for a better understanding of such a device reference should be had to U.S. Pat. No. 3,538,766 granted Nov. 10, 1970.

According to the presently preferred embodiment of the invention a cylindrical chamber 14 is mounted on bracket 4. The chamber is closed at one end 62 and is provided at the other end thereof with an end cap 64. Carried by the end cap is a sleeve 66 which is dimensioned to receive one end of a capillary tube 68 which is connected at its other end with inlet conduit 28 containing the fluid to be metered. Thus, the fluid pressure within the inlet conduit is communicated to the interior of chamber 14. Any fluctuations in fluid pressure within the conduit 28 are communicated via the capillary tube to chamber 14.

Positioned within chamber 14 is a sealed pressure sensing element 16. The element is of the bellows-type and may be fabricated from a plurality of diaphragms to form a diaphragm stack as is known. The pressure sensing element 16 is secured at one end thereof to end wall 62 of the chamber and is extendible linearly at its other end so as to shift a rod 70 in response to changes in pressure within chamber 14. The pressure sensing element 16 is evacuated to substantially zero absolute pressure. Thus, the pressure sensing element establishes a zero reference pressure against which variations in the pressure within conduit 28 can be compared and translated into pressure compensation for the continuous integrator through link transfer assembly 26.

Push rod 70 is connected at one end thereof to the pressure sensing element 16. A pivot link 72 is secured pivotally to the other end of push rod 70 and is fulcrummed about a fixed pivot 74 which is located at a bellows seal 76. As can be seen clearly from FIG. 3 a cone element 75 is secured to the lower surface of chamber 14 such as by welding. The cone element is apertured longitudinally to permit pivot link 72 to extend therethrough. A transverse opening is formed in the cone dimensioned to receive a pivot pin 74 which passes through said opening and an aligned opening in pivot link 72 to provide a fixed pivot. Cone element 75 is formed with an annular flange 79 to which the bellows 76 is secured as by welding to complete the bellows seal.

The frusto conical portion of the cone is provided with a longitudinally extending slot 81 to thus provide the capability of pivotal movement therewithin of the pivot link 72. Pivot link 72 is formed with a first segment 78 which extends through bellows seal 76 and is pivotally connected at the free end thereof to the outer end of push rod 70. Integral with segment 78 is an offset portion 80 which extends in a generally downwardly direction and is hinged such as by means of a pivot pin 82 to one end of a link member 84. The other end of link 84 is connected by means such as a pivot pin 86 with one end of an adjustment arm 88. Pivot pins 82 and 86 may be replaced with ball bearing pivots in which a ball is affixed to one of the connecting links and is disposed within an aperture formed in the other link member and held in position by a spring finger secured to the first link having the ball. Such pivotal arrangements are well known. Adjustment arm 88 includes a screw 90 having a limit nut 92 threadedly received thereon and an adjustment nut 94 located at an intermediate region of the screw entrapped within a collar 96. The upper end of screw 90 extends through an aperture formed in a yoke arm 98 which is secured by means of screw 100 to shaft 102. By means of adjustment nut 94 the length of arm 88 can be adjusted.

Bracket 4 serves to journal the reduced end portions of shaft 102 and to thereby establish a fixed pivot axis 104 about which lower link 106 may pivot to thereby position yoke 126 and the ring 58 rotatively trapped therewithin at varying radial locations on the surface of friction disc 50. The outwardly extending leg 12 of bracket 4 has a depending portion 110 which is provided with an opening therethrough to journal reduced portion 112 of shaft 102. Inner leg 10 of bracket 4 has an opening dimensioned to journal reduced portion 112 of shaft 102. Inner leg 10 of bracket 4 has an opening dimensioned to journal reduced portion 114 of shaft 102.

Lower link 106 comprises upper segment 113 in the form of a bifurcated yoke the slot of which is configured to receive the reduced end portion 112 of shaft 102 therewithin. A screw 111 is threadedly received within aligned openings in the spaced arms of yoke 113 to secure the yoke fixedly to shaft 102 for rotation therewith. Lower link 106 further includes arms 116, 118 which are interconnected by means of an adjustment screw 120 by means of which the position of arm 118 may be adjusted relative to arm 116. It will also be observed most clearly from FIG. 1 that arm 116 is formed with a longitudinal slot 122 through which screws 124 extend and are threadedly received in yoke 113. In this manner the link 106 may thus have the length thereof adjusted as desired.

Secured to the lower end of link 106 is a yoke 126. The yoke 126 extends in a direction substantially perpendicular to the lower link 106 and is provided with a longitudinal slot within which ring 58 is rotatively trapped. The ring 58 encircles roller 60 and, as stated previously, is clamped between the roller and friction disc 50 by virtue of the disc being urged upwardly under the force of spring 52.

The disc 50 will be rotated about the axis of shaft 48 which, in turn, is driven off the meter output shaft 22 through gearing 42, 44 and 46. The ring is rotated by disc 50 and drives roller 60 which is journaled at one end thereof (not shown) with the frame for corrected counter 38. The presently preferred mounting of roller 60 is by means of a double bearing within the frame for counter 38 with the other end of the roller being cantilevered as shown. It will be noted that the roller 60 and ring 58 are thus driven at a speed which is commensurate with the radial distance from the axis of shaft 48 to the point at which ring 58 rides on the disc.

In operation, and as shown diagrammatically in FIG. 4, as the line pressure within inlet conduit 28 increases, due either to changes in barometric pressure or in the composition of the gas, the pressure increase is communicated via capillary tube 68 to the interior of chamber 14. The increased pressure causes the pressure sensing element 16 to contract. This results in a shifting of push rod 70 to the right and pivotal movement of pivot link 72 about its fulcrum 74. Link member 84 and adjustment arm 88 are caused to swing as shown, the arm 88 effecting pivotal movement of yoke arm 98 and shaft 102. The shaft 102 rotates in a clockwise direction carrying with it lower link 106. Yoke 126 is caused to steer ring 58 in the manner of the front wheel of a bicycle. As soon as the ring 58 is tilted it attempts to straighten itself out and realign itself with the repositioned end of yoke 126 adjacent the portion of lower link 106 which has been shifted. Such realignment results in movement of the ring to a new radial location along the disc 50 so as to drive roller 60 at an increased speed representative of the increase in absolute pressure of the gas being measured.

It will thus be appreciated that by arranging the pressure sensing element 16 within the chamber 14 such that there is a pressure differential which is measured against a nearly perfect vacuum the variation in pressure being measured is absolute pressure. When there are barometric pressure changes they will not directly lead to expansion or contraction of the pressure sensing element because the pipe line pressure has not changed. However, the pipe line is generally provided with a regulator and pressure gage. If, for example, the regulator has been set to maintain a 5 pound gage pressure, when the atmospheric pressure changes the regulator will sense the change and regulate the absolute pressure in the pipe (upwardly or downwardly) to maintain the required 5 pound gage differential. According to prior art devices the corrected volume would not change (and thus the consumer would be billed for the same volume of gas (even though such volume actually changed) because the 5 pound gage pressure would have remained constant. By the compensating mechanism of the present invention, when the regulator adjusts the line pressure to reflect the change in atmospheric pressure this is immediately sensed by the pressure sensing means within chamber 14 and by means of the link transfer assembly the ring 58 is repositioned on disc 50 to impart to roller 60 the proper representative rotational speed.

FIG. 5 of the drawings depicts a modified form of construction which includes chamber 14a, pressure sensing element 16a and capillary tube 68a. As shown in FIG. 5 the capillary tube is connected to the pressure sensing element 16a in order to communicate changes in line pressure to the interior thereof. The chamber 14a is evacuated to substantially zero absolute pressure. Thus, the zero reference pressure is nevertheless established and the pressure sensing element will move linearly directly proportional to the variations of the absolute pressure being measured.

Numerous alterations of the structure herein disclosed will suggest themselves to those skilled in the art. However, it is to be understood that the present disclosure relates to a preferred embodiment of the invention which is for purposes of illustration only and not be construed as a limitation of the invention. All such modifications which do not depart from the spirit of the invention are intended to be included within the scope of the appended claims.

Having thus set forth the nature of the invention, what is claimed herein is:

1. A device for continuously measuring the line absolute pressure of the throughput flow of a meter connected in the line, said device comprising:
   a. a housing having a chamber sealed from atmospheric pressure therein,
   b. a pressure sensing means mounted in the housing and having one end extending in the chamber freely to move responsive to changes in the line absolute pressure,
   c. a link transfer assembly having one end connected to the free end of the pressure sensing means,
   d. a flexible seal means connected to the housing in sealed communication with the chamber,
   e. the link transfer assembly extends sealingly outwardly through and partakes of pivotal motion at said seal means,
   f. a pressure index continuous integrator associated with the meter and connected to and operated responsive of movements of the outer end of the link transfer assembly, and
   g. conduit means connected between the line and the housing to communicate line absolute pressure to one or the other of the chamber or the pressure sensing means, with the other being evacuated to substantially zero absolute pressure whereby changes in the line absolute pressure will be sensed by the pressure sensing means and transmitted by the link transfer assembly to the integrator to correct the volume of the throughput flow measured by the meter corresponding to changes in the line absolute pressure.

2. The combination claimed in claim 1 wherein:
   a. the pressure sensing means defines a vacuum bellows disposed in the chamber with one end mounted to the housing,
   b. the seal means defines a sealing bellows, and
   c. the free end of the vacuum bellows is connected to the link transfer assembly and will move substantially linearly responsive to variations in the line absolute pressure communicated to the chamber, and the link transfer assembly will partake of pivotal motion at the sealing bellows.

3. The combination claimed in claim 2 wherein:
a. the link transfer assembly partakes of pivotal movement at the sealing bellows responsive to shifting of the vacuum bellows.

4. A device for continuously measuring the line absolute pressure of the throughput flow being measured by a meter connected in the line, said device comprising:
a. a housing having a chamber therein sealed from atmospheric pressure,
b. a conduit means connected between the line and the housing to communicate line absolute pressure to the chamber,
c. a vacuum bellows mounted in the chamber with one end affixed to the housing and the other end freely movable responsive to variations in the line absolute pressure,
d. a sealing bellow connected to the housing in sealed communication with the chamber,
e. a link transfer assembly extending through and in sealed relationship with the sealing bellows to enter the chamber and connect to the free end of the vacuum bellows,
f. the link transfer assembly partakes of pivotal motion at the sealing bellows,
g. a pressure index continuous integrator operatively associated with the meter and connected to be operated by the link transfer assembly responsive to variations in the line absolute pressure to continuously correct the volume of the throughput flow measured by the meter corresponding to changes in the line absolute pressure.

* * * * *